United States Patent
Yu

(10) Patent No.: US 10,645,368 B1
(45) Date of Patent: May 5, 2020

(54) METHOD AND APPARATUS FOR ESTIMATING DEPTH OF FIELD INFORMATION

(71) Applicant: SHANGHAITECH UNIVERSITY, Shanghai (CN)

(72) Inventor: Jingyi Yu, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 16/678,057

(22) Filed: Nov. 8, 2019

Related U.S. Application Data

(63) Continuation of application No. PCT/CN2017/086956, filed on Jun. 2, 2017.

(51) Int. Cl.
| | |
|---|---|
| *H04N 13/271* | (2018.01) |
| *G06N 3/04* | (2006.01) |
| *G06N 3/08* | (2006.01) |
| *H04N 13/395* | (2018.01) |
| *H04N 13/156* | (2018.01) |
| *G06T 5/50* | (2006.01) |
| *H04N 13/00* | (2018.01) |

(52) U.S. Cl.
CPC ......... *H04N 13/271* (2018.05); *G06N 3/0454* (2013.01); *G06N 3/08* (2013.01); *G06T 5/50* (2013.01); *H04N 13/156* (2018.05); *H04N 13/395* (2018.05); *H04N 2013/0081* (2013.01)

(58) Field of Classification Search
None
See application file for complete search history.

(56) References Cited

U.S. PATENT DOCUMENTS

| | | | |
|---|---|---|---|
| 8,432,434 B2 * | 4/2013 | Veeraraghavan | G01B 11/22 348/46 |
| 10,270,957 B2 * | 4/2019 | Jouet | G06T 5/50 |
| 10,353,271 B2 | 7/2019 | Wang et al. | |
| 2015/0062370 A1 * | 3/2015 | Shroff | H04N 5/2226 348/222.1 |
| 2015/0347820 A1 * | 12/2015 | Yin | G06K 9/00221 382/118 |

FOREIGN PATENT DOCUMENTS

| | | |
|---|---|---|
| CN | 104952048 A | 9/2015 |
| CN | 105488534 A | 4/2016 |
| CN | 106157307 A | 11/2016 |
| CN | 106779055 A | 5/2017 |

OTHER PUBLICATIONS

PCT International Search Report and the Written Opinion dated Feb. 28, 2018, issued in corresponding International Application No. PCT/CN2017/086956 (9 pages).

* cited by examiner

*Primary Examiner* — Nancy Bitar
(74) *Attorney, Agent, or Firm* — Sheppard, Mullin, Richter & Hampton LLP

(57) ABSTRACT

A method and apparatus for extracting depth information from a focal stack is disclosed. The method may include processing the focal stack through a focus convolutional neural network (Focus-Net) to generate a plurality of feature maps, stacking the plurality of feature maps together, and fusing the plurality of feature maps by a plurality of first convolutional layers to obtain a depth image. The Focus-Net includes a plurality of branches, and each branch includes a downsampling convolutional layer having a different stride for downsampling the focal stack and a deconvolutional layer for upsampling the focal stack.

18 Claims, 19 Drawing Sheets

Focal Stack

FocusNet

FocusNet-V2

Ground Truth

Focal Stack

FocusNet

FocusNet-V2

Ground Truth

Focal Stack

StereoNet

BDfFNet

Ground Truth

FocusNet-V2

StereoNet

BDfFNet

FocusNet-V2

StereoNet

METHOD AND APPARATUS FOR ESTIMATING DEPTH OF FIELD INFORMATION

CROSS-REFERENCE TO RELATED APPLICATION

This application is a continuation application of International Patent Application No. PCT/CN2017/086956, filed on Jun. 2, 2017 and entitled "METHOD AND APPARATUS FOR ESTIMATING DEPTH OF FIELD INFORMATION." The above-referenced application is incorporated herein by reference in its entirety.

TECHNICAL FIELD

The disclosure relates generally to a method and apparatus for estimating depth of field information of images, and more particularly, to a method and apparatus for extracting depth of field information from a focal stack.

BACKGROUND

With a rapid growth of the mobile phone market, more and more people get used to taking pictures with phone cameras. The phone cameras are developed with more functionalities by using advanced computational photography techniques. For instance, iPhone 7 and Huawei's Honor 8 use a dual-camera system to simulate a shallow depth of field (DoF). Google's "Lens Blur" app achieves similar results by moving a camera. In essence, the camera captures images with different viewpoints, making it possible to yield depth from such images through exploitation of parallax. The depth information is then used to synthesize the shallow DoF. However, the quality of the produced depth map by the phone cameras is often rather poor, especially in the boundary regions. Also the camera is not able to offer an instant response to users due to a high computational cost.

To obtain high-quality depth information, the above-mentioned approaches often require a complex camera system, or a longer capturing time. To overcome these limitations, we focus on estimating depth information from a focal stack, which is already available by using a phone camera. Each time a user takes a photo with a mobile phone, the camera rapidly sweeps the focal plane through the scene to find the best auto-focus setting. The resulting set of images are called a focal stack that contains the depth information of the scene. For those phones come with a dual camera system, the captured images form a binocular focal stack.

To obtain depth from a focal stack, one conventional approach is to utilize a depth-from-focus (DfF) to exploit differentiations of sharpness at each pixel across a focal stack and assign the layer with highest sharpness as its depth. To exploit binocular cues, traditional stereo matching algorithms rely on feature matching and optimization to maintain the Markov Random Field (MRF) property: the disparity field should be smooth everywhere with abrupt changes at the occlusion boundaries. Both methods utilize optimization algorithms, e.g. graph-cut and belief propagation, to find the optimal results. However, the optimization process tends to be slow. Meanwhile, there is very few work on combing the depth from focus and disparity.

To address these issues, in this disclosure, we developed several networks to obtain the depth information from a focal stack or a binocular focal stack. Our approaches can obtain results with a higher quality and a shorter amount of time, thus, are more accurate and efficient.

SUMMARY

One aspect of the present disclosure is directed to a method for extracting depth information from a focal stack. The method may include processing the focal stack through a focus convolutional neural network (Focus-Net) to generate a plurality of feature maps, stacking the plurality of feature maps together; and fusing the plurality of feature maps by a plurality of first convolutional layers to obtain a depth image. The Focus-Net may include a plurality of branches, and each branch may include a downsampling convolutional layer having a different stride for downsampling the focal stack and a deconvolutional layer for upsampling the focal stack.

Another aspect of the present disclosure is directed to a method for extracting depth information from a stereo image. The method may include processing the stereo image through a stereo convolutional neural network (Stereo-Net) to obtain a second depth image. The Stereo-Net may include a plurality of rounds of a downsampling part and an upsampling part. Each downsampling part may include a plurality of max pooling layers interleaved with a plurality of first residual modules. Each upsampling part may include a plurality of deconvolutional layers interleaved with a plurality of second residual modules.

Another aspect of the present disclosure is directed to an apparatus for extracting depth information from a focal stack. The apparatus may include a data capture unit comprising a first digital camera configured to generate a first focal stack, a data processing unit comprising a processor and a memory, the memory embodying a focus convolutional neural network (Focus-Net). The apparatus may further include a second digital camera configured to generate a second focal stack, and a stereo convolutional neural network (Stereo-Net) to obtain a second depth image.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this disclosure, illustrate several non-limiting embodiments and, together with the description, serve to explain the disclosed principles.

DETAILED DESCRIPTION OF THE EMBODIMENTS

Figure 1:
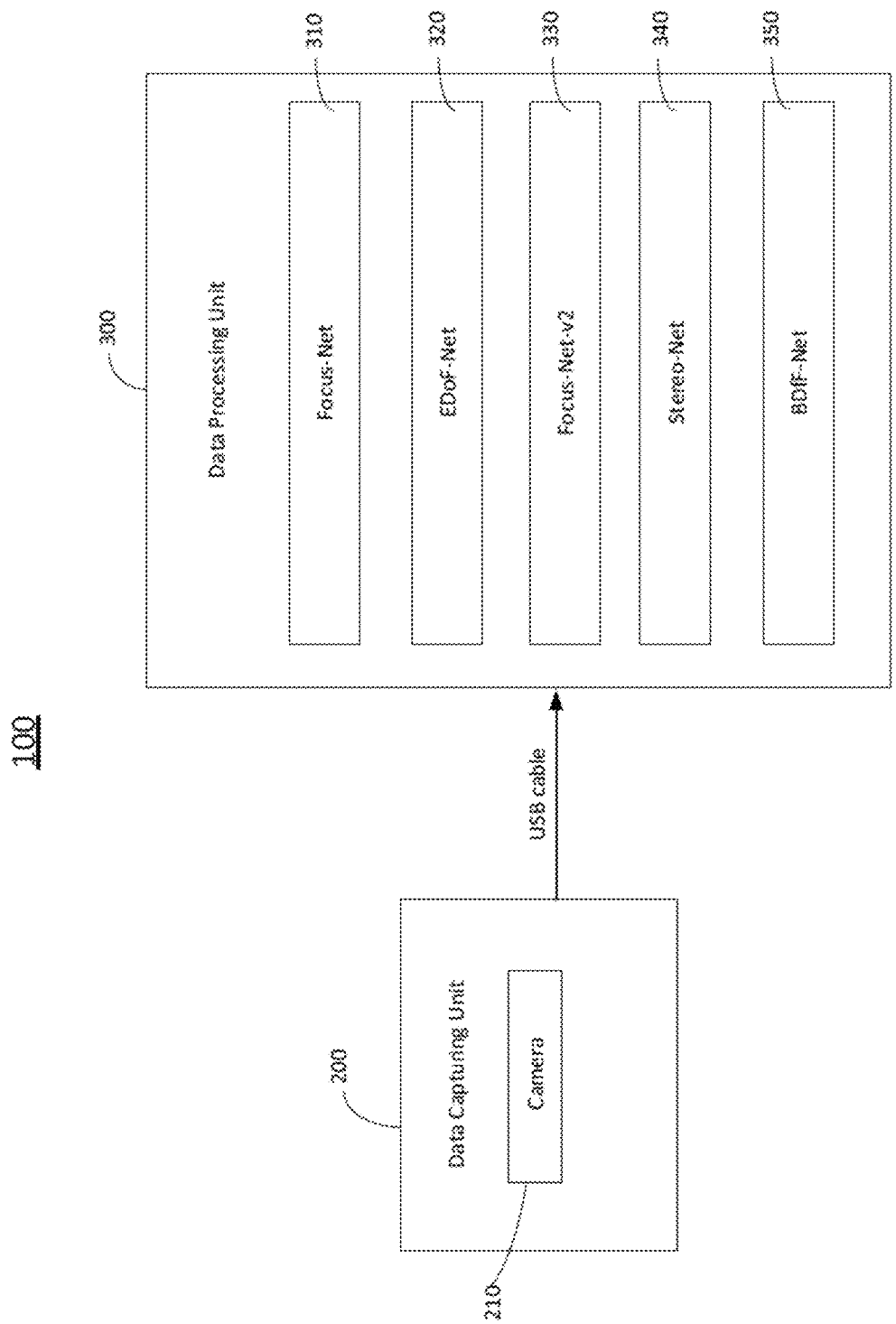
FIG. 1 is a schematic diagram for a depth of field information extraction system, consistent with exemplary embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

1. Introduction and Definitions

Many approaches have been proposed for obtaining depth from focus and stereo. For depth from focus, existing methods rely on hand-crafted features to estimate the focusness or the blur kernel (a kernel performs blurring functions). For stereo, conventional methods use manually designed functions to compute a similarity score between image patches. These approaches are often not accurate or time-efficient.

In this disclosure, we leverage the deep learning algorithm and present a plurality of networks: (1) a Focus-Net, in short of a focus convolutional neural network (CNN), is a multi-scale network to extract depth from a single focal stack; (2) an EDoF-Net, in short of an extended depth-of-field CNN, is a deep network to obtain an extended depth of field (EDoF) image from a focal stack; and (3) a Stereo-Net, a stereo CNN to obtain depth directly from a stereo pair. The EDoF image from EDoF-Net can be used to guide the refinement of the depth from the Focus-Net by forming a Focus-Net-v2, and to provide inputs for the Stereo-Net. We also integrate the Focus-Net and the Stereo-Net into a unified solution, a binocular depth-of-field CNN (BDfF-Net), to obtain the depth information by combining binocular and focus cue.

Compared with conventional methods, our approaches work in significantly less amount of time. To speed up the depth estimation, we take an end-to-end learning approach, thus avoiding the time-consuming global optimization. For example, our Focus-Net-v2 is able to obtain the depth information from a focal stack in less than 1 s, while conventional methods usually take much more time that is orders of magnitude longer than ours. The Stereo-Net is also able to largely reduce the computational time while improving the accuracy of the depth map.

In addition, conventional 2D images from a mobile phone may have a large DoF and a fixed viewpoint. Our methods enable shallow DoF effects as well as perspective shift that may be only available in expensive digital single-lens reflex (DSLR) cameras. Although there exists phones with similar functionalities, they either rely on complexity hardware, or longer capturing time for taking images at multiple viewpoints. In contrast, our approaches are more efficient, and require no modification to the camera. Since the camera will sweep the scene before taking images, the focal stack is already available. Therefore, the focal stack will be directly fed into the Focus-Net-v2 to estimate the depth information. The Focus-Net-v2 may outperform state-of-the-art techniques in both accuracy and speed.

Moreover, the BDfF-Net is capable of extracting the depth information from a binocular focal stack. The BDfF-Net utilizes both disparity and defocus cue and finds the optimal combination of the two. For a phone equipped with a dual camera system, such as iPhone 7 or Honor 8, the BDfF-Net could combine the strengths from the disparity cue and defocus cue, generating a higher-quality depth map. Also, each component of BDfF-Net, i.e. Focus-Net-v2, EDoF-Net and Stereo-Net, is able to function individually.

Further, our methods can refocus images at different object, as well as control the synthetic aperture size/blurriness. The depth map will also allow users to observe the scene at new perspectives by synthesize novel views. The networks can be adapted to the mobile phone or tablet by adding depth sensing in the build-in camera apps. The depth sensing capability can recover 3D geometry of a scene, enabling new augmented reality, virtual reality and mixed reality applications.

In this disclosure, a focal stack refers to a collection of images each focused at a different depth. Combining these slices of images forms a single composite that exhibits the desired DoF.

Deep learning (also known as deep structured learning, hierarchical learning or deep machine learning) is a study of artificial neural networks and related machine learning algorithm that contain more than one hidden layer. Deep learning algorithms transform their inputs through more layers than shallow learning algorithms.

In machine learning, a convolutional neural network (CNN, or ConvNet) is a type of feed-forward artificial neural network. The architecture of a typical CNN is composed of multiple layers where each layer performs a specific function of transforming its input into a useful representation.

CNNs are usually applied to image data. Convolution is a general purpose filter effect for images. A convolutional layer is the core building block of a CNN. The layer's parameters consist of a set of learnable "kernels" (filters), which have a small "receptive field", but extend through the full depth of the "input volume". During the forward pass, each kernel is convolved across the width and height of the input volume, computing the dot product between the entries of the kernel and the input and producing a 2-dimensional "activation map" of that kernel. As a result, the network learns kernels that activate when it detects some specific type of "feature" at some spatial position in the input. Stacking the activation maps for all kernels along the depth dimension forms the full "output volume" of the convolutional layer.

Every image is a matrix of pixel values. The range of values that can be encoded in each pixel depends upon its bit size. Most commonly, we have 8 bit or 1 Byte-sized pixels, and the possible range of values a single pixel can represent is [0, 255]. With colored images, particularly RGB (Red, Green, Blue)-based images, the presence of separate color channels (3 in the case of RGB images) introduces an additional 'depth' field to the data, making the input 3-dimensional. For example, an RGB image has 32×32 (width× height) pixels and 3 color channels, and the image can be represented by 3 matrices, denoted as 32×32×3. The 3 matrices of the image constitute a 3-dimensional structure called the "input volume". The "depth" of the "output volume" is a hyper-parameter: it corresponds to the number of kernels used, and each kernel is used to look for different features in the input. In computer graphics and digital imaging, image scaling refers to the resizing of a digital image.

A "feature" is a distinct and useful observation or pattern obtained from the input data that aids in performing the desired image analysis. For example, a feature can be a point, a line, an edge, etc. The CNN learns the features from the input images.

In image processing, a "kernel", or a convolution matrix is a small matrix of numbers that is used in image convolutions. It is used for feature detection, i.e., the kernels can be viewed as feature identifiers. This is accomplished by doing a convolution between a kernel and an image. Differently sized kernels containing different patterns of numbers produce different results under convolution. A two dimensional region "covered" by the kernel "patch" is called the "receptive field", and the numbers in the kernel matrix are called weights or parameters.

The kernels are convolved with the input volume to obtain so-called "activation maps" or feature maps. Activation maps indicate "activated" regions, i.e. regions where features specific to the kernel have been detected in the input.

Upsampling can refer to the entire process of increasing the sampling rate of a signal, or it can refer to just one step of the process, the other step being interpolation. Downsampling is a process of reducing the sampling rate of a signal.

A "stride" controls how a kernel convolves around the input volume. The amount by which the kernel shifts is the stride. For example, if a stride is 1, the kernel convolutes around the input volume by shifting one unit at a time; and if a stride is 2, the kernel convolutes around the input volume by shifting two units at a time.

"Zero-padding" refers to the process of symmetrically adding zeroes to the input matrix, i.e., padding the input volume with zeros around the border. It's a commonly used modification that allows the size of the input to be adjusted to a desired requirement. It is mostly used in designing the CNN layers when the dimensions of the input volume need to be preserved in the output volume.

A key aspect of the CNN is "pooling layers", typically applied after the convolutional layers. The most common way to do pooling it to apply a "max pooling" to the result of each kernel. Its function is to progressively reduce the spatial size of the representation to reduce the amount of parameters and computation in the network, and hence to also control overfitting. A max pooling layer operates independently on every depth slice of the input and resizes it spatially, using the MAX operation. The most common form is a pooling layer with kernels of size 2×2 applied with a stride of 2. It downsamples every depth slice in the input by 2 along both width and height, discarding 75% of the activations, leaving the depth dimension unchanged.

PreLU is the abbreviation of Parametric Rectified Linear Unit. The purpose is to introduce nonlinearity to a system that basically has just been computing linear operations during the convolutional layers.

A deconvolutional layer can be viewed as a convolutional layer that uses the same components (kernel, pooling) but in reverse. Instead of mapping pixels to features, a deconvolutional layer does the opposite.

A residual module is a shortcut block used in Residual Networks which skips convolutional layers by using shortcut connections. Stacking residual modules can greatly improve training efficiency and largely resolve the degradation problem by employing MSR.

An Hourglass architecture is a convolutional network architecture initially used for human pose estimation. Features are processed across all scales and consolidated to best capture the various spatial relationships. It includes successive steps of pooling and upsampling that are done to produce a final set of predictions.

2. System Overview

FIG. 1 shows an exemplary DoF extraction system 100 in accordance with an embodiment of the present disclosure. The system 100 may include a number of components, some of which may be optional. In some embodiments, the system 100 may include many more components than those shown in FIG. 1. However, it is not necessary that all of these components be shown in order to disclose an illustrative embodiment.

As shown in FIG. 1, the system 100 may include a data capturing unit 200 and a data processing unit 300. The data capturing unit 200 may include one or more digital camera 210. The data processing unit 300 includes a process and a memory. The memory may include computer instructions embodying a Focus-Net unit 310, an EDoF-Net unit 320, a Focus-Net-v2 unit 330, a Stereo-Net unit 340, and a BDfF-Net unit 350.

3. Data Capturing Unit

There is no particular limitation on the digital camera 210 in the data capturing unit 200, and it can be any commercially available digital cameras. In one embodiment, the digital camera 210 may be a phone camera; in another embodiment, the digital camera 210 may be a camera on a tablet; in another embodiment, the digital camera 210 may be a camera on a computer. In some embodiments, the digital camera 210 may include more than one camera, for example, a dual camera system in iPhone 7 or Huawei's Honor 8 mobile phone.

Figure 2:
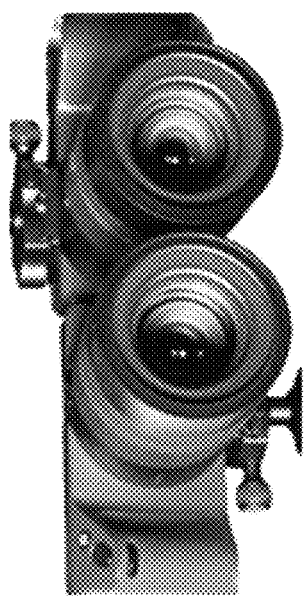
FIG. 2 is a photograph of an exemplary stereo setup, consistent with exemplary embodiments of the present disclosure.

In some embodiments, the digital camera 210 may include two light field (LF) cameras to form a binocular stereo setup. An LF camera, also known as a plenoptic camera, captures light travelling in every direction through a scene. That is, contrasted with a conventional camera, which records only light intensity, an LF camera captures both the intensities and the directions of the light rays. This enables sophisticated data processing even after the image data is captured. One can for example virtually change focus or perspective, or estimate depth maps from a single exposure. In some embodiments, two Lytro Illum LF cameras may be used as the digital camera 210, as illustrated in FIG. 2. The Lytro Illum LF cameras may include a micro-lens array to capture multiple views of the scene, allowing users to perform post-capture refocusing. In this disclosure, the two LF cameras share the same configuration including the zoom and focus settings.

3.1 Data Capturing Method

In some embodiments, each time a user take a photo with a digital camera, for example, a mobile phone camera, the camera sweeps the focal plane through the scene to find the best auto-focusing setting. The resulting set of images forms a focal stack that contains depth information of the scene. Therefore, instead of taking multiple images, the focal stack can be directly used to estimate the depth information without any modification to the camera. In some embodiments, the digital camera 210 may include a dual camera system, and the captured images form a binocular focal stack.

In some embodiments, a dual focal stack dataset can be generated based on FlyThings3D dataset (N. Mayer, et al. "A large dataset to train convolutional networks for disparity, optical flow, and scene flow estimation", *CVPR*, pages 4040-4048, 2016) by using a method of virtual DSLR (Y. Yang, et al. "Virtual DSLR:high quality dynamic depth-of-field synthesis on mobile platforms", *Digital Photography and Mobile Imaging XII*, pages 1-9, 2016).

In some embodiments, raw images are captured by the binocular stereo setup formed by two LF cameras. The raw images are preprocessed using an Light Field Toolbox (D. Dansereau, et al. "Calibration and rectification for lenselet-based plenoptic cameras", *CVPR*, pages 1027-1034, 2013), and then refocused by using a shift-and-add algorithm (R. Ng, et al. "Light field photography with a hand-held plenoptic camera", *Stanford University Computer Science Tech Report*, 2:1-11, 2005) to obtain the focal stack.

4. Data Processing Unit

As shown in FIG. 1, the data processing unit 300 may include a Focus-Net unit 310, an EDoF-Net unit 320, a Focus-Net-v2 unit 330, a Stereo-Net unit 340, and a BDfF-Net unit 350.

4.1 Focus-Net

Figure 3:
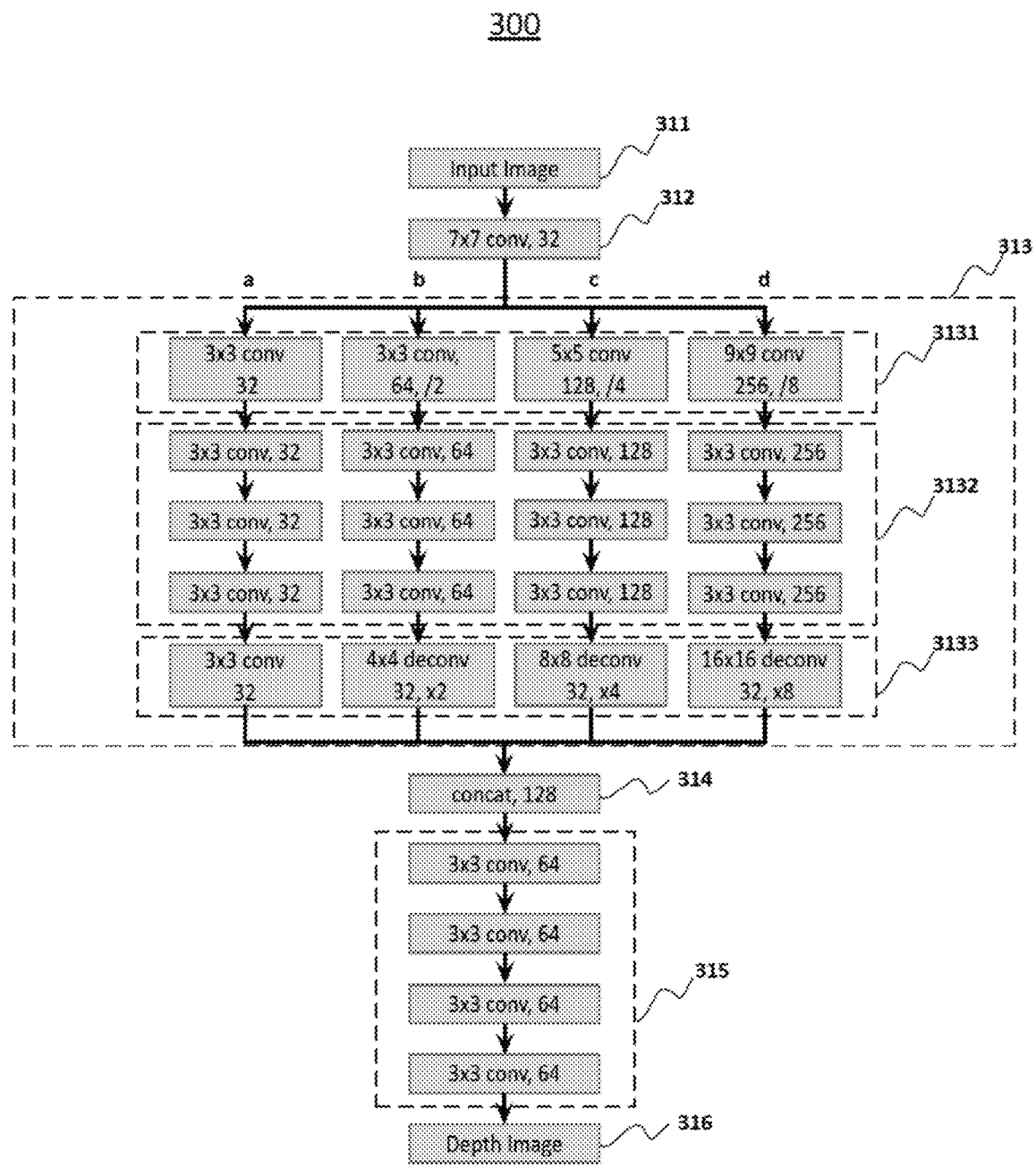
FIG. 3 is a diagram illustrating an architecture of a Focus-Net, consistent with exemplary embodiments of the present disclosure.

A Focus-Net, is a multi-scale network that extract depth from a single focal stack. FIG. 3 is a diagram illustrating the architecture of a Focus-Net 300, consistent with exemplary embodiments of the present disclosure. At step 311, a focal stack is input into the Focus-Net unit 310 as the input image. In some embodiments, the focal stack may include 16 depth images, and each having 960×540 pixels. At step 312, a convolutional layer is applied to the focal stack, which may include a 32 kernels, each having a 7×7 matrix. At step 313, the output of the step 312 is processed through 4 branches, a, b, c, and d, to obtain a plurality of feature maps. Step 313 may include a plurality of sub-steps, 3131, 3132 and 3133. At sub-step 3131, except branch a, branches b, c and d downsample images of the focal stack by using different strides in the convolutional layer, enabling aggregation of information over large areas. Therefore, the images are processed at different scales, and both high-level information and fine details could be preserved. In some embodiments, the strides may be 2, 4 and 8 for branches b, c and d respectively. At sub-step 3132, a plurality of convolutional layers are applied to the images in each branch to identify features and obtain feature maps. Each convolutional layer in branches a, b, c and d at sub-step 3132 may include 32, 64, 128 and 256 kernels respectively. At sub-step 3133, a deconvolutional layer may be introduced to upsample the images to their original resolution. At the end of step 313, a plurality of multi-scale feature maps are obtained. At step 314, the obtained multi-scale feature maps from the 4 branches are concatenated (i.e., stacked and linked together). At step 315, the concatenated multi-scale feature maps are fused by a plurality of convolutional layers to obtain the depth information of the focal stack. At step 316, a depth image of the focal stack which includes the depth information can be obtained. For most convolutional and deconvolutional layers, 3×3 kernels are used except those layers used for downsampling and upsampling. In some embodiments, spatial padding is also applied for each convolutional layer to preserve resolution, and between the convolutional layers a PReLU layer may be inserted to increase the network's nonlinearity.

In deep learning, bilinear or bicubic upsampling are commonly used upsampling methods. A bilinear upsampling works by interpolating pixel color values, introducing a continuous transition into the output even where the original material has discrete transitions. A bicubic upsampling, in contrast to bilinear upsampling, which only takes 4 pixels (2×2) into account, considers 16 pixels (4×4). Images resampled with bicubic interpolation are smoother and have fewer interpolation artifacts. However, both bilinear and bicubic upsampling have fixed and identical kernels, therefore, the features processed by these two upsampling algorithms may have limited representation power.

In the present disclosure, a deconvolutional layer is used to upsample the images. The deconvolutional layer automatically learns upsampling kernels from a dataset, by assembling separable kernel inversion for deconvolution. These kernels are more diverse and meaningful, and are better suited for the application. Moreover, the nonlinear terms and high dimensional structure make the network more expressive than traditional methods. In addition, it is also reasonably robust to outliers.

4.2 EDoF-Net

The obtained depth image may be refined/upsampled with a guidance of an intensity image, and there may be different approaches. A common observation in image processing is that homogeneous texture regions often correspond to homogeneous surface parts, while depth edges often occur at high intensity variations. Based on such observation, an extended depth-of-field (EDoF) image may be extracted from the focal stack to guide the refinement of the depth image. An EDoF-Net is developed to extract the EDoF image.

Figure 4:
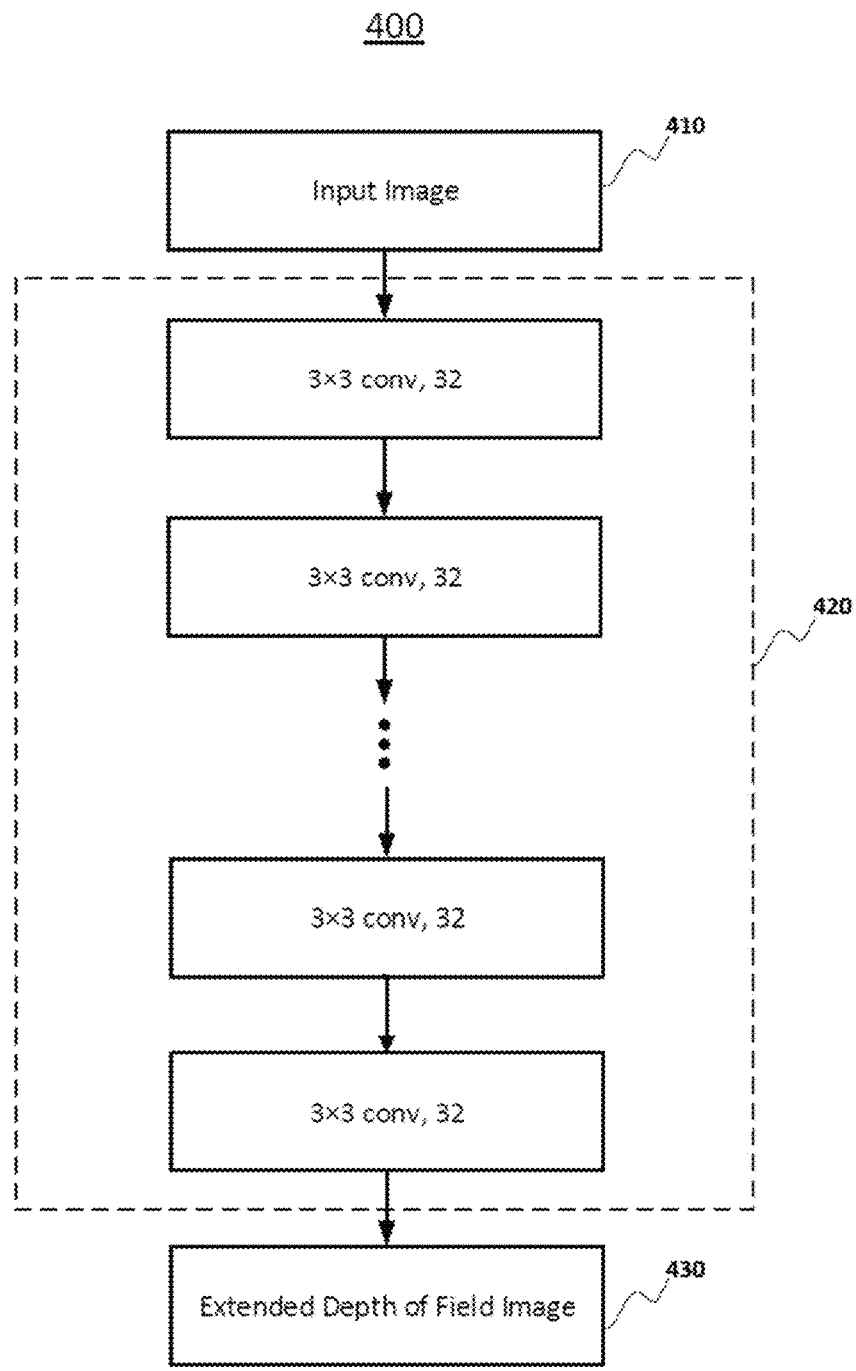
FIG. 4 is a diagram illustrating an architecture of an EDoF-Net, consistent with exemplary embodiments of the present disclosure.

FIG. 4 is a diagram illustrating the architecture of an EDoF-Net 400, consistent with exemplary embodiments of the present disclosure. In some embodiments, the EDoF-Net 400 is composed of 20 convolutional layers, with PReLU as its activation function. As shown in FIG. 4, at step 410, the focal stack is input into the EDoF-Net unit 320. At step 420, the convolutional layers are applied on the images of the focal stack. Each convolutional layer has 32 kernels, each having a 3×3 matrix. A 20 convolutional layer network can produce a 41×41 receptive field, which is larger than the largest blur kernel. At step 430, an EDoF image is obtained for the focal stack.

4.3 Focus-Net-v2

Figure 5:
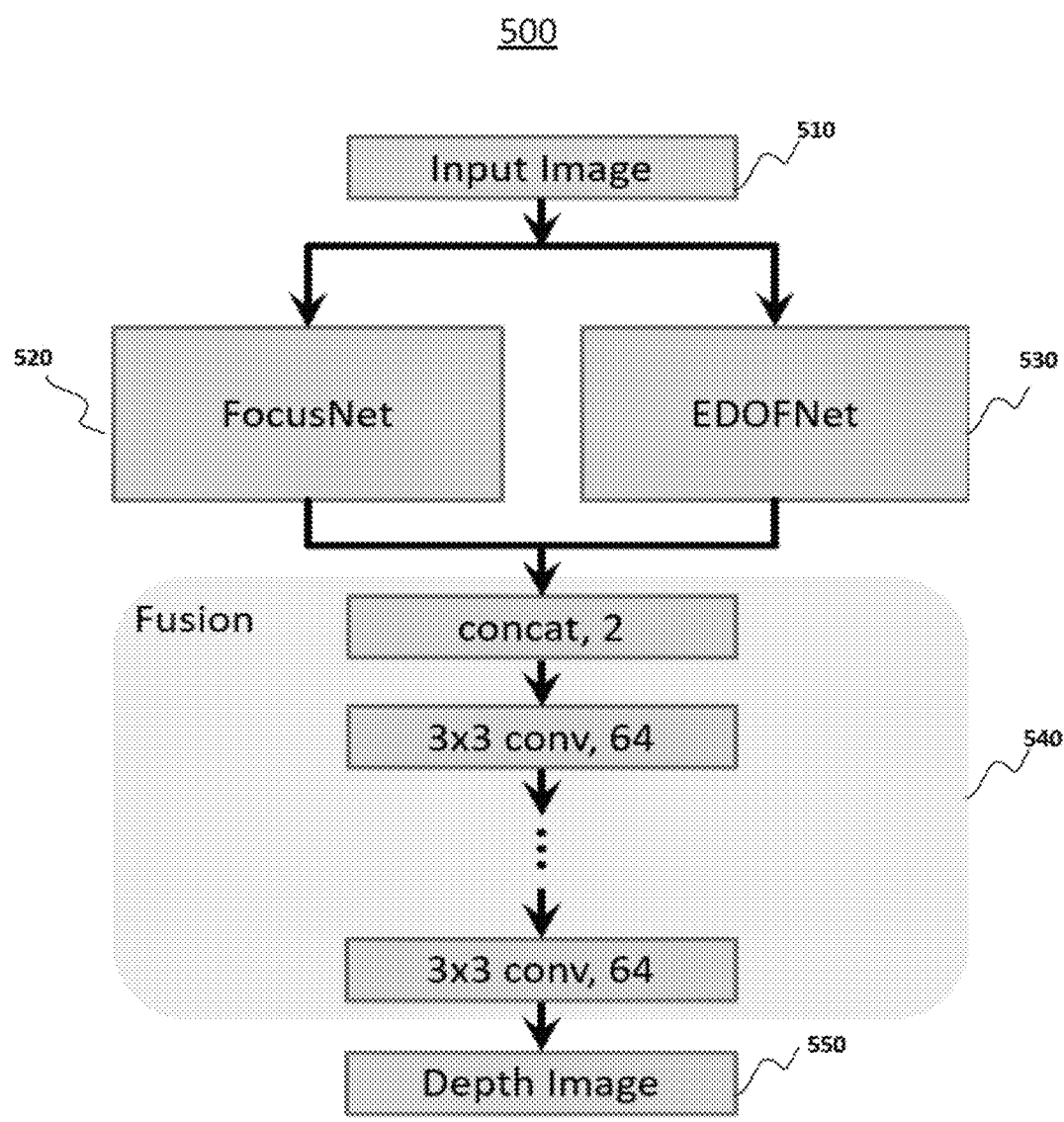
FIG. 5 is a diagram illustrating an architecture of a Focus-Net-v2, consistent with exemplary embodiments of the present disclosure.

The obtained EDoF image from the EDoF-Net can be used to refine the depth map from the Focus-Net. Therefore, a new network, Focus-Net-v2, can be constructed by combining the Focus-Net and EDoF-Net. FIG. 5 shows an architecture of a Focus-Net-v2 (500), consistent with exemplary embodiments of the present disclosure. At step 510, the focal stack is input into the Focus-Net-v2 unit 330. At step 520, the Focus-Net generates the depth map; and at step 530, the EDoF-Net generates the EDoF image respectively. Then at step 540, the depth image and the EDoF image are concatenated, and fused by another 10 layers of convolutional network. Each of the convolutional layer include 64 of 3×3 kernels. At step 550, a refined depth image can be obtained.

4.4 Stereo-Net

Figure 6A:
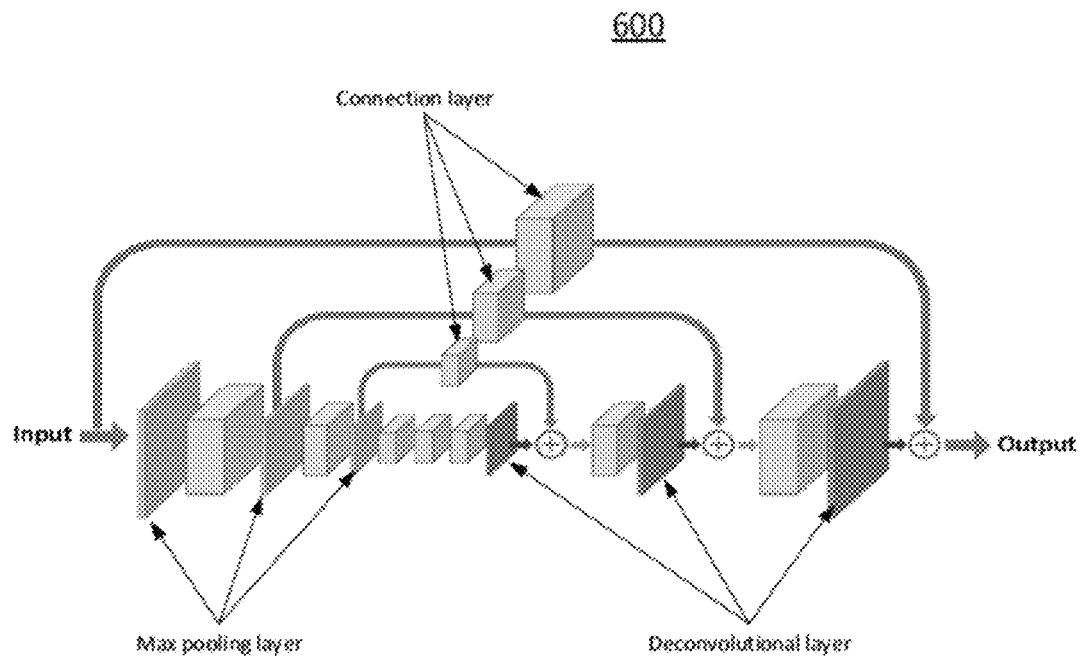
FIG. 6A is a graphical illustration showing an architecture of a Stereo-Net.
Figure 6B:
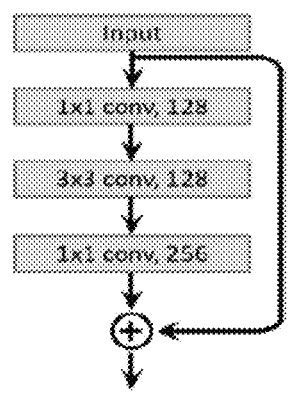
FIG. 6B is a graphical illustration showing a detailed residual module, consistent with exemplary embodiments of the present disclosure.

The EDoF-Net in the EDoF-Net unit 320 is also capable of generating a stereo pair image from a binocular focal stack. A stereo pair image contains two views of a scene side by side. One of the views is intended for the left eye and the other for the right eye. Given the EDoF stereo pair image from the EDoF-Net, depth information from stereo can be estimated by using a Stereo-Net in the Stereo-Net unit 340. The Stereo-Net follows the Hourglass network architecture, and FIG. 6A shows the architecture of a Stereo-Net 600, consistent with exemplary embodiments of the present disclosure. The Stereo-Net 600 consists of a downsampling part and an upsampling part. The downsampling part is composed of a series of max pooling layers (as labeled in FIG. 6A) interleaved with residual modules (shown as blocks in FIG. 6A), and the upsampling part is a mirrored architecture of the downsampling part, with max pooling replaced by deconvolutional layers (as labeled in FIG. 6A). For every pair of max pooling and deconvolutional layer, there may be a connection layer comprising of a residual module. FIG. 6B shows a detailed architecture of an exemplary residual module. The residual module may include a first convolutional layer with 128 kernels, each having a 1×1 matrix, a second convolutional layer with 128 kernels, each having a 3×3 matrix, and a third convolutional layer with 256 kernels, each having a 1×1 matrix. Element wise addition follows to add processed lower-level features to higher-level features. The depth information can be estimated at the end of the upsampling part. One round of a downsampling and an upsampling part can be viewed as one iteration of processing, whereas additional rounds can be stacked to refine the initial estimation. In some embodiments, two iterations of processing are used to obtain the depth information from stereo via the Stereo-Net.

4.5 BDfF-Net

Figure 7A:
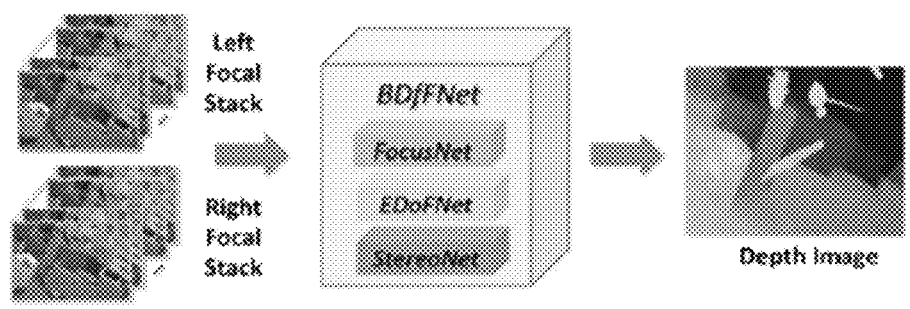
FIGS. 7A and 7B are graphical illustrations showing an architecture of a BDfF-Net, consistent with exemplary embodiments of the present disclosure.
Figure 7B:
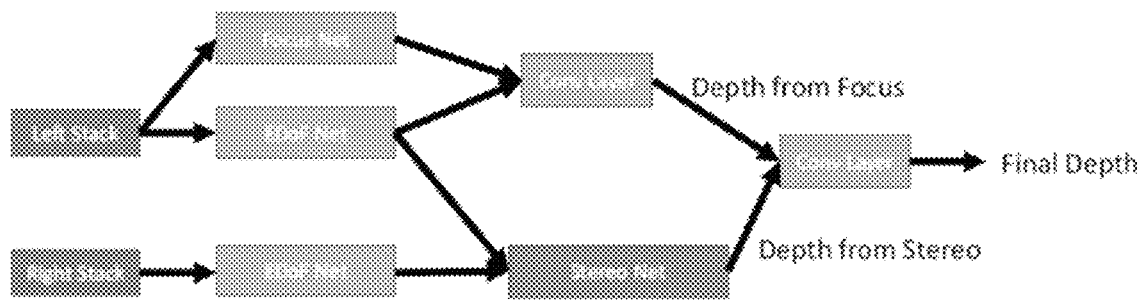

Having developed the Focus-Net-v2, EDoF-Net and Stereo-Net, we can integrate all the networks to construct a BDfF-Net to extract depth information from a binocular focal stack. FIGS. 7A and 7B show an exemplary architecture of a BDfF-Net, consistent with exemplary embodiments of the present disclosure. As shown in the FIGS. 7A and 7B, a binocular focal stack is input to the BDfF-Net unit 350. In one route, the left stack can be input to a Focus-Net to generate a depth image, and an EDoF-Net to generate an EDoF image. Then the depth image and EDoF images can be concatenated to obtain a refined depth image from focus information. This is equivalent to a Focus-Net-v2 performance. In the other route, both the left and right stack go through the EDoF-Net separately to generate a stereo pair. The stereo pair then can be input to a Stereo-Net to estimate the depth information from stereo. Finally, by concatenating the results from above networks and fusing the refined depth image from the left stack and the depth image from the stereo pair by using additional convolutional layers, the final depth information of the binocular focal stack can be obtained. The additional convolutional layers serve to find the optimal combination from focus cue and disparity cue.

The BDfF-Net is the first algorithm to extract depth information from a binocular focal stack. The BDfF-Net utilizes both disparity and focus cue, and finds the optimal combination of the two. Compared with conventional methods, the BDfF-Net can generate results in significantly less amount of time.

5. Examples

In the following, a plurality of examples are presented to illustrate results and effects of the disclosed networks. These examples are intended as illustrations of several aspects of the invention, and should not be considered as any limitation to the invention.

Figure 8A:
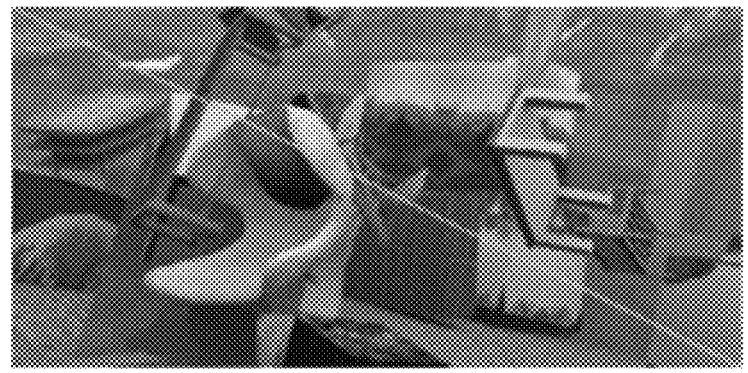
FIGS. 8A, 8B, 8C, 8D, 8E, and 8F are examples showing a binocular focal stack pair, consistent with exemplary embodiments of the present disclosure.
Figure 8B:
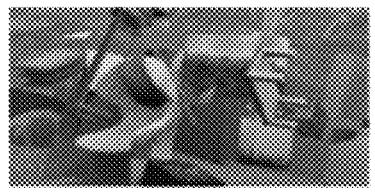
Figure 8C:
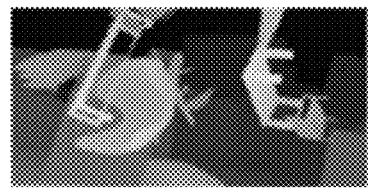
Figure 8D:
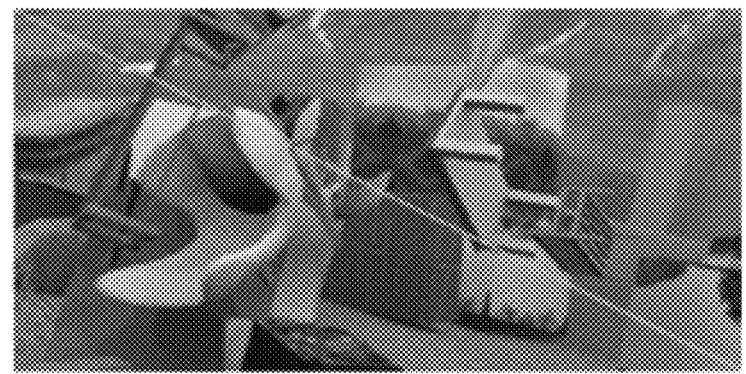
Figure 8E:
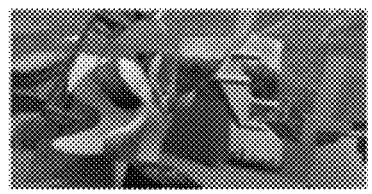
Figure 8F:
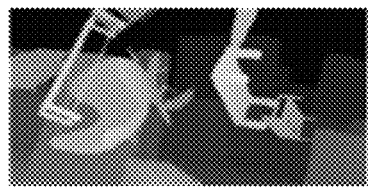

In some embodiments, as discussed previously, a dual focal stack dataset may be generated based on FlyThings3D dataset by using a method of virtual DSLR. The quality of the rendered binocular focal stack is comparable to those captured by a DSLR camera. Next, Poisson noises are added to the generated focal stack to simulate real images captured by a camera. In some embodiments, the generated focal stack may consist 16 depth layers, i.e., 16 images each focused at a different depth. FIGS. 8A, 8B, 8C, 8D, 8E, and 8F illustrate a binocular focal stack pair and their corresponding color and depth images, consistent with exemplary embodiments of the present disclosure. A binocular focal stack pair consists two horizontally rectified focal stacks, shown as FIGS. 8A and 8D for example. An upper an a lower triangle in FIGS. 8A and 8D represent corresponding slices focusing at different depths. FIGS. 8B and 8C show ground truth color and depth images for FIG. 8A, and FIGS. 8E and 8F show ground truth color and depth images for FIG. 8B. "Ground truth" is a term used to refer to information provided by direct observation as opposed to information provided by inference.

Figure 9A:
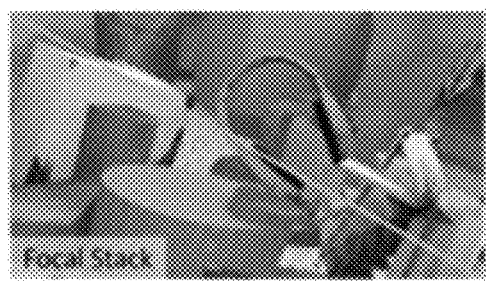
FIGS. 9A, 9B, 9C, 9D, 9E, and 9F are examples showing results from an EDoF-Net performance, consistent with exemplary embodiments of the present disclosure.
Figure 9B:
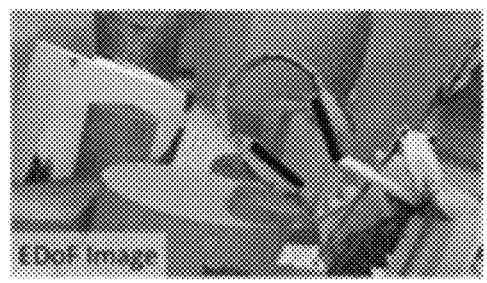
Figure 9C:
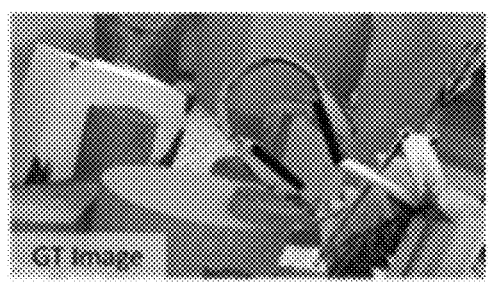
Figure 9D:
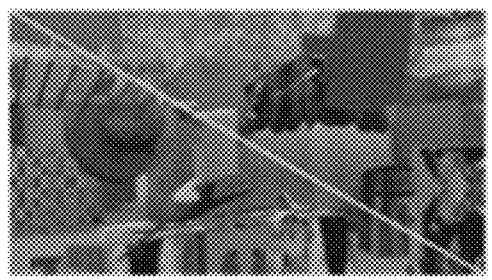
Figure 9E:
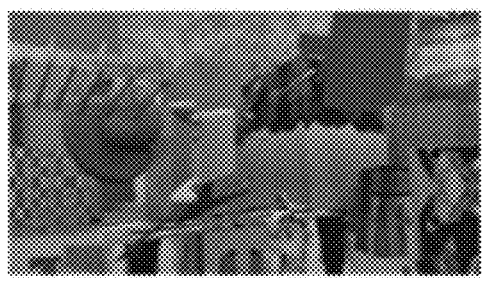
Figure 9F:
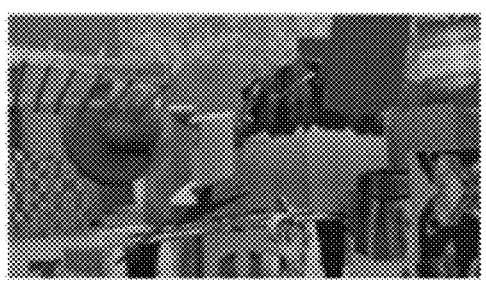

Then the generated focal stacks are processed by using a Focus-Net, an EDoF-Net, a Focus-Net-v2, a Stereo-Net and a BDfF-Net. In some embodiments, the focal stack includes 16 depth layers and has a dimension of 960×540. FIGS. 9A, 9B, 9C, 9D, 9E, and 9F represent the results from an EDoF-Net performance. An upper and a lower triangle in FIGS. 9A and 9D represent 2 slices of the focal stack focused at different depths. FIGS. 9B and 9E show the corresponding EDoF images, and FIGS. 9C and 9F show the corresponding ground truth images. Compared with the ground truth images, the produced EDoF images are slightly blurry. However, given a very noisy focal stack as input, the resultant EDoF images get rid of a large part of noises. The results show that the quality of the EDoF images is sufficient to guide the refinement of depth images, and the EDoF images can be used as the input of a Stereo-Net.

Figure 10A:
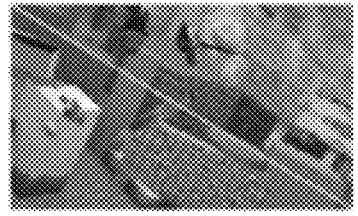
FIGS. 10A, 10B, 10C, 10D, 10E, 10F, 10G, and 10H are examples comparing results from a Focus-Net performance and a Focus Net-2 performance, consistent with exemplary embodiments of the present disclosure.
Figure 10B:
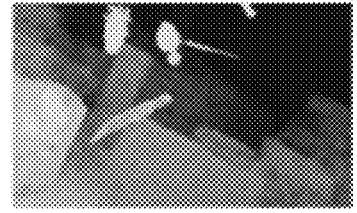
Figure 10C:
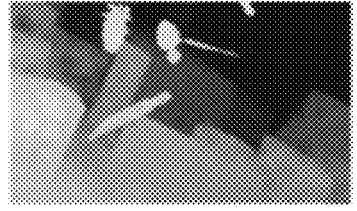
Figure 10D:
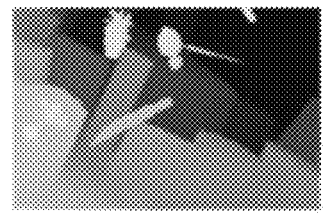
Figure 10E:
Figure 10F:
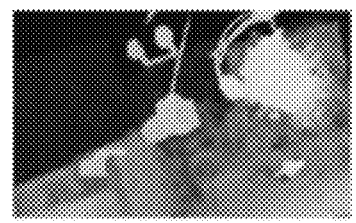
Figure 10G:
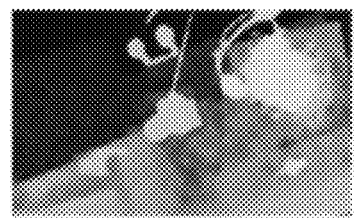
Figure 10H:
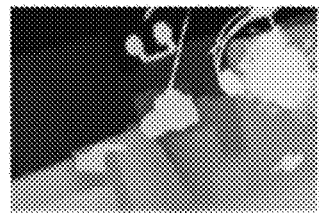
Figure 11A:
FIGS. 11A, 11B, 11C, 11D, 11E, 11F, 11G, and 11H are examples comparing results from a Stereo-Net performance and a BDfF-Net performance, consistent with exemplary embodiments of the present disclosure.
Figure 11B:
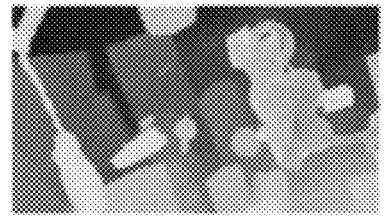
Figure 11C:
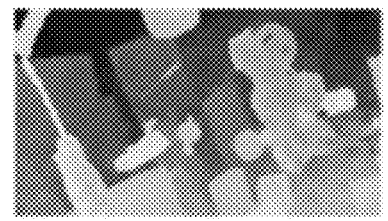
Figure 11D:
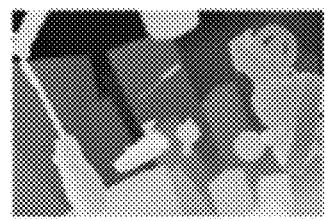
Figure 11E:
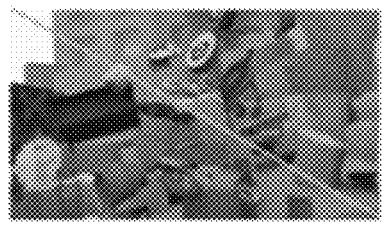
Figure 11F:
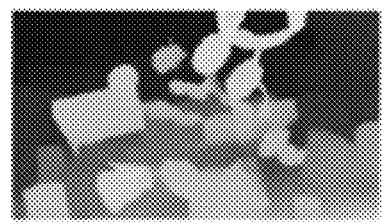
Figure 11G:
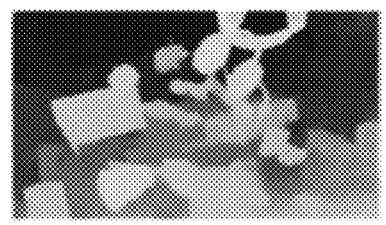
Figure 11H:
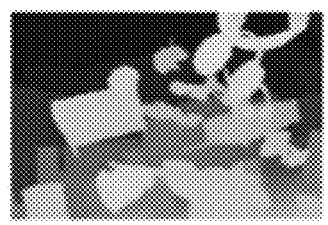

FIGS. 10A, 10B, 10C, 10D, 10E, 10F, 10G, and 10H compare the results from a Focus-Net performance and a Focus-Net-v2 performance. FIGS. 10B and 10F are Focus-Net images without a guidance of all-focus images (EDoF images); and FIGS. 10C and 10G are Focus-Net-v2 images with a guidance of all-focus images. FIGS. 11A, 11B, 11C, 11D, 11E, 11F, 11G, and 11H compare the results from a Stereo-Net performance and a BDfF-Net performance. FIGS. 11B and 11F are Stereo-Net images, and FIGS. 11C and 11G are BDfF-Net images. Table 1 lists the mean absolute error (MAE) and running time for processing the focal stacks by each network. As shown in Table 1, the result from the BDfF-Net has the least MAE. Also as shown in FIGS. 11C and 11G, the BDfF-Net generates much sharper boundaries while reducing blocky artifacts.

TABLE 1

|  | Focus-Net | Focus-Net-v2 | Stereo-Net | BDfF-Net |
|---|---|---|---|---|
| MAE | 0.045 | 0.031 | 0.024 | 0.021 |
| Time (s) | 0.6 | 0.9 | 2.8 | 9.7 |

Figure 12A:
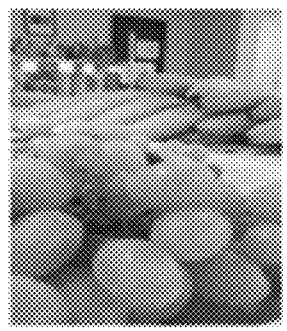
FIGS. 12A, 12B, 12C, 12D, 12E, 12F, 12G, and 12H are examples comparing the results of the depth estimation from a single focal stack, consistent with exemplary embodiments of the present disclosure.
Figure 12B:
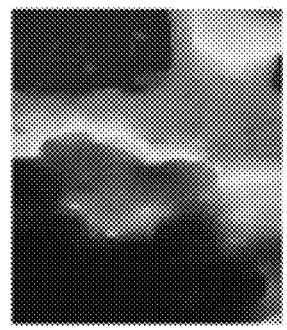
Figure 12C:
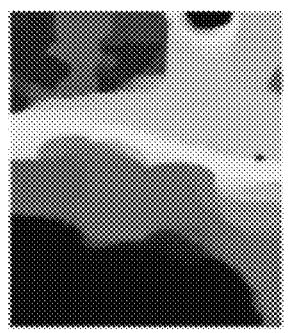
Figure 12D:
Figure 12E:
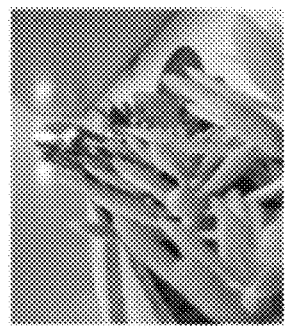
Figure 12F:
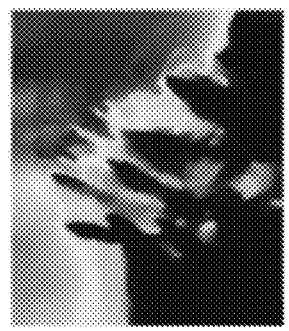
Figure 12G:
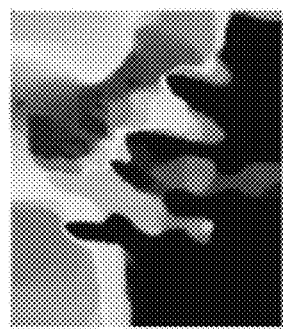
Figure 12H:
Figure 13A:
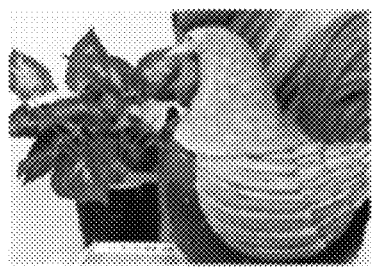
FIGS. 13A, 13B, 13C, 13D, 13E, 13F, 13G, and 13H are examples comparing real scene results from a Focus-Net-v2 performance, a Stereo-Net performance and a BDfF-Net performance, consistent with exemplary embodiments of the present disclosure.
Figure 13B:
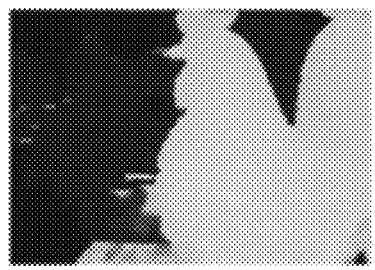
Figure 13C:
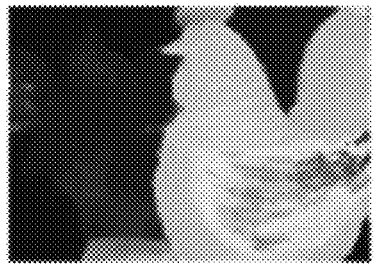
Figure 13D:
Figure 13E:
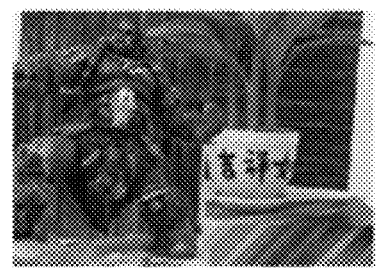
Figure 13F:
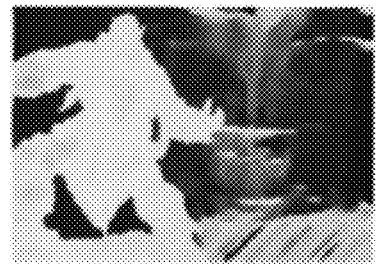
Figure 13G:
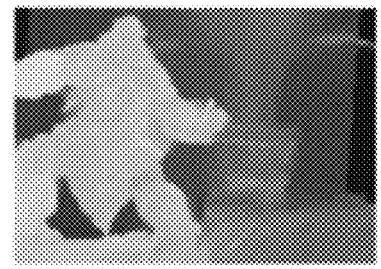
Figure 13H:
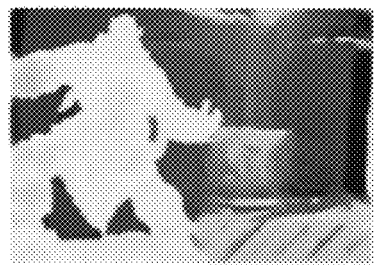

In some embodiments, a Focus-Net-v2 is compared with two approaches in literature on depth from focus on real scene images. One of the approaches is from S. Suwajanakorn, et al. (S. Suwajanakorn, C. Hernandez, and S. M. Seitz, "Depth from focus with your mobile phone", *CVPR*, pages 3497-3506, 2015), and the other is from M. Moeller, et al. (M. Moeller, M. Benning, C. B. Schoenlieb, and D. Cremers, "Variational depth from focus reconstruction", *IEEE Trans. Image Process.*, 24(12):5369-5378, 2015). We use the data provided by S. Suwajanakorn, et al. and select 16 images from the focal stack for depth from focus. FIGS. 12A, 12B, 12C, 12D, 12E, 12F, 12G, and 12H represent the comparison on the results of the depth estimation from a single focal stack. FIGS. 12A and 12E are real scene images, while FIGS. 12B and 12F show the results from S. Suwajanakorn, et al. approach, FIGS. 12C and 12G show results from M. Moeller, et al. approach, and FIGS. 12D and 12H show results using the Focus-Net-v2. The comparison illustrates that the Focus-Net-v2 is able to maintain smoothness on flat regions while preserving sharp occlusion boundaries. Therefore, the Focus-Net-v2 is capable of estimating disparity value with a higher quality. In addition, the process by using a Focus-Net-v2 takes significantly less amount of time (0.9 s), compared with approaches from S. Suwajanakorn, et al. (10 mins) and M. Moeller, et al. (4 s).

To physically implement binocular focal stacks, in some embodiments, raw images are captured by the binocular stereo setup formed by the two Lytro Illum LF cameras, as previously discussed. The raw images are preprocessed and refocused to synthesize the binocular focal stack. FIGS. 13A, 13B, 13C, 13D, 13E, 13F, 13G, and 13H show the estimated depth maps from a Focus-Net-v2 performance, a Stereo-Net performance and a BDfF-Net performance respectively. Results show that BDfF-Net (FIGS. 13D and 13H) benefits from both Focus-Net-v2 (FIGS. 13B and 13F) and Stereo-Net (FIGS. 13C and 13G), and offers smoother depth with sharper edges.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The invention described and claimed herein is not to be limited in scope by the specific preferred embodiments disclosed herein, as these embodiments are intended as illustrations of several aspects of the invention. Indeed, various modifications of the invention in addition to those shown and described herein will become apparent to those skilled in the art from the foregoing description. Such modifications are also intended to fall within the scope of the appended claims.

What is claimed is:

1. A method for extracting depth information from a focal stack, comprising: processing the focal stack through a focus convolutional neural network (Focus-Net) comprising a plurality of branches to obtain a plurality of feature maps, each branch comprising a downsampling convolutional layer having a different stride for downsampling the focal stack and a deconvolutional layer for upsampling the focal stack; stacking the plurality of feature maps together; fusing the plurality of feature maps by a plurality of first convolutional layers to obtain a depth image; processing the focal stack through an extended depth-of-field convolutional neural network (EDoF-Net) to obtain an extended depth-of-field (EDoF) image; concatenating the depth image and the EDoF image; and fusing the depth image and the EDoF image using a plurality of third convolutional layers to refine the depth image.

2. The method of claim 1, wherein the Focus-Net comprises a parametric rectified linear unit (PreLU) layer.

3. The method of claim 1, wherein the Focus-Net comprises four branches.

4. The method of claim 1, wherein the EDoF-Net comprises a plurality of second convolutional layers and a PreLU layer.

5. A method for extracting depth information from a stereo image, comprising: processing the stereo image through a stereo convolutional neural network (Stereo-Net) to obtain a second depth image, the Stereo-Net comprising a plurality of rounds of a downsampling part and an upsampling part, wherein each downsampling part comprising a plurality of max pooling layers interleaved with a plurality of first residual modules, each upsampling part comprising a plurality of deconvolutional layers interleaved with a plurality of second residual modules; processing a first focal stack through a focus convolutional neural network (Focus-Net) comprising a plurality of branches to obtain a plurality of feature maps, each branch comprising a downsampling convolutional layer having a different stride to downsample the focal stack and a deconvolutional layer configured to upsample the focal stack; stacking the plurality of feature maps together; fusing the plurality of feature maps by a plurality of first convolutional layers to obtain a first depth image; processing the first focal stack and a second focal stack through an extended depth-of-field convolutional neural network (EDoF-Net) to obtain the stereo image comprising a first EDoF image and a second EDoF image; concatenating the first depth image and the first EDoF image; and fusing the first depth image and the first EDoF image using a plurality of third convolutional layers to refine the first depth image.

6. The method of claim 5, wherein the downsampling part is connected to the upsampling part through a connection layer comprising a third residue module.

7. The method of claim 5, wherein the Stereo-Net comprises two rounds of downsampling part and upsampling part.

8. The method of claim 5, wherein the FocusNet comprises a PreLU layer.

9. The method of claim 5, wherein the FocusNet comprises four branches.

10. The method of claim 5, further comprising: processing the first focal stack and a second focal stack through an extended depth-of-field convolutional neural network (EDoF-Net) to obtain the stereo image comprising a first EDoF image and a second EDoF image.

11. The method of claim 5, further comprising: concatenating the first depth image and the second depth image; and fusing the first depth image and the second depth image using a plurality of fourth convolutional layers to obtain a third depth image.

12. An apparatus for extracting depth information from a focal stack, comprising: a data capture unit comprising a first digital camera configured to generate a first focal stack; and a data processing unit comprising a processor and a memory, the memory embodying instructions that when executed by the processor cause the processor to: process the first focal stack through a focus convolutional neural network (Focus-Net) comprising a plurality of branches to obtain a plurality of feature maps, each branch comprising a downsampling convolutional layer having a different stride for downsampling the focal stack and a deconvolutional layer for upsampling the focal stack; stack the plurality of feature maps together; fuse the plurality of feature maps by a plurality of first convolutional layers to obtain a first depth image; process the first focal stack through an extended depth-of-field convolutional neural network (EDoF-Net) to obtain a first EDoF image, the EDoF-Net comprising a plurality of second convolutional layers and a PreLU layer; concatenate the first depth image and the first EDoF image; and fuse the first depth image and the first EDoF image using a plurality of third convolutional layers to refine the first depth image.

13. The apparatus of claim 12, wherein the FocusNet comprises four branches.

14. The apparatus of claim 12, wherein the data capture unit comprises a second digital camera configured to generate a second focal stack.

15. The apparatus of claim 14, wherein the processor is further configured to:
process the second focal stack through the extended depth-of-field convolutional neural network (EDoF-Net) to obtain a second EDoF image; and
process the first EDoF image and the second EDoF image through a stereo convolutional neural network (Stereo-Net) to obtain a second depth image, the Stereo-Net comprising a plurality of rounds of a downsampling part and an upsampling part,
wherein each downsampling part comprises a plurality of max pooling layers interleaved with a plurality of first residual modules, each upsampling part comprises a plurality of deconvolutional layers interleaved with a plurality of second residual modules.

16. The apparatus of claim 15, wherein the downsampling part is connected to the upsampling part through a connection layer comprising a third residue module.

17. The apparatus of claim 16, wherein the Stereo-Net comprises two rounds of downsampling part and upsampling part.

18. The apparatus of claim 16, wherein the processor is further configured to:
concatenate the first depth image and the second depth image; and
fuse the first depth image and the second depth image using a plurality of fourth convolutional layers to obtain a third depth image.

* * * * *